(12) United States Patent
Nishimoto et al.

(10) Patent No.: US 12,344,179 B2
(45) Date of Patent: Jul. 1, 2025

(54) SIDE AIRBAG DEVICE AND VEHICLE

(71) Applicants: TS TECH CO., LTD., Asaka (JP); HONDA MOTOR CO., LTD., Tokyo (JP)

(72) Inventors: Naoya Nishimoto, Tochigi (JP); Yudai Matsui, Tochigi (JP); Kenta Hirayama, Tokyo (JP); Manabu Matsumoto, Tokyo (JP)

(73) Assignees: TS TECH CO., LTD., Saitama (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/392,937

(22) Filed: Dec. 21, 2023

(65) Prior Publication Data

US 2024/0208449 A1    Jun. 27, 2024

(30) Foreign Application Priority Data

Dec. 22, 2022 (JP) ................................. 2022-205966

(51) Int. Cl.
*B60R 21/207*    (2006.01)
*B60R 21/215*    (2011.01)
*B60R 21/231*    (2011.01)

(52) U.S. Cl.
CPC .......... *B60R 21/207* (2013.01); *B60R 21/215* (2013.01); *B60R 21/23138* (2013.01)

(58) Field of Classification Search
CPC ............ B60R 21/207; B60R 21/23138; B60R 2021/23153
See application file for complete search history.

(56) References Cited

U.S. PATENT DOCUMENTS

| 9,896,053 | B2 * | 2/2018 | Tanabe ................. B60R 21/217 |
| 10,005,418 | B2 * | 6/2018 | Ito ......................... B60R 21/207 |
| 11,273,784 | B2 * | 3/2022 | Hashimoto ....... B60R 21/23138 |
| 11,325,553 | B2 * | 5/2022 | Negishi ................ B60R 21/217 |
| 11,590,918 | B2 * | 2/2023 | Negishi ................ B60R 21/217 |

(Continued)

FOREIGN PATENT DOCUMENTS

| JP | 2016020143 A | * | 2/2016 | |
| JP | 2019156170 A | * | 9/2019 | ........... B60R 21/207 |

(Continued)

*Primary Examiner* — Drew J Brown
*Assistant Examiner* — Tiffany L Webb
(74) *Attorney, Agent, or Firm* — HSML P.C.

(57) ABSTRACT

A side airbag device is provided between a body and a seat of a vehicle. The side airbag device includes an airbag module, a base member, and a retainer member. The base member is disposed between the body and the seat, and includes an airbag housing portion in which the airbag module is contained. The retainer member is a member that supports the airbag housing portion. The retainer member includes a retainer body and a retainer attaching portion extending downward from the retainer body. The base member includes a base member body in which the airbag storage is provided, and a cover extending from the base member body. The retainer attaching portion includes a fastening portion that fastens the retainer member to the body or a frame of the seat. The cover extends at least to a position where the fastening portion is disposed and covers the retainer attaching portion.

11 Claims, 15 Drawing Sheets

(56) References Cited

U.S. PATENT DOCUMENTS

| | | | |
|---|---|---|---|
| 12,077,121 B2* | 9/2024 | Negishi | B60R 21/207 |
| 2016/0009248 A1* | 1/2016 | Tanabe | B60R 21/215 |
| | | | 280/728.2 |
| 2017/0036635 A1* | 2/2017 | Tanabe | B60R 21/217 |
| 2017/0174169 A1* | 6/2017 | Tanabe | B60R 21/217 |
| 2018/0001860 A1* | 1/2018 | Tanabe | B60R 21/2171 |
| 2018/0001861 A1* | 1/2018 | Tanabe | B60R 21/017 |
| 2018/0222427 A1* | 8/2018 | Tanabe | B60R 21/216 |
| 2020/0391687 A1* | 12/2020 | Negishi | B60R 21/217 |
| 2022/0258688 A1* | 8/2022 | Negishi | B60R 21/217 |
| 2023/0192023 A1* | 6/2023 | Negishi | B60R 21/217 |
| | | | 280/741 |

FOREIGN PATENT DOCUMENTS

| | | | | |
|---|---|---|---|---|
| JP | 2019156172 A | * | 9/2019 | |
| JP | 2019156173 A | | 9/2019 | |
| WO | WO-2016010012 A1 | * | 1/2016 | B60R 21/017 |
| WO | WO-2017022678 A1 | * | 2/2017 | B60R 21/207 |

* cited by examiner

FIG.6
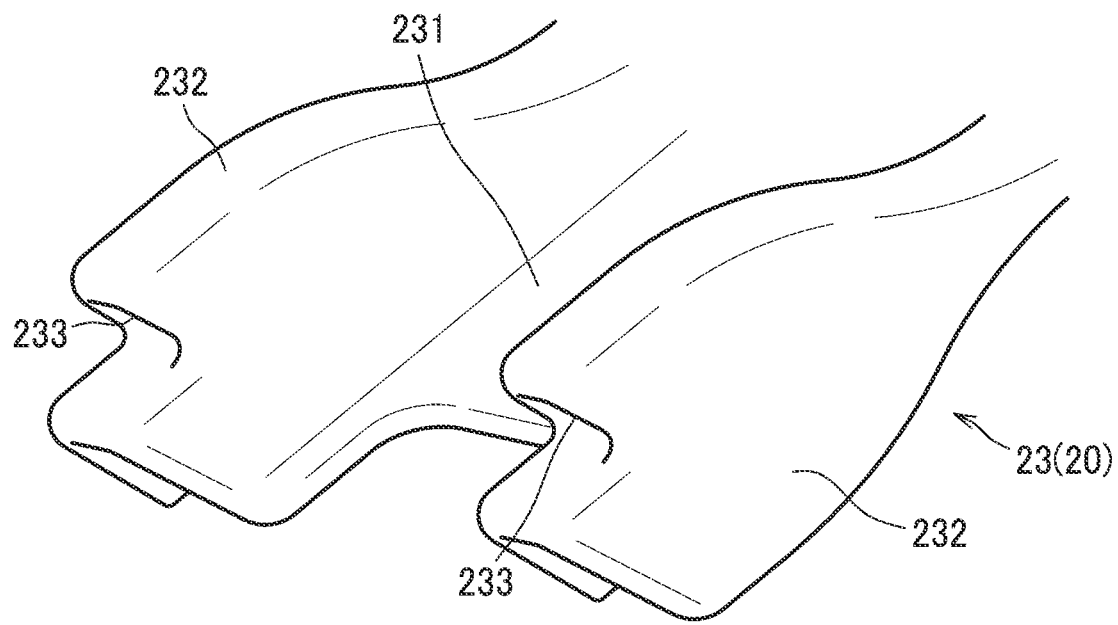
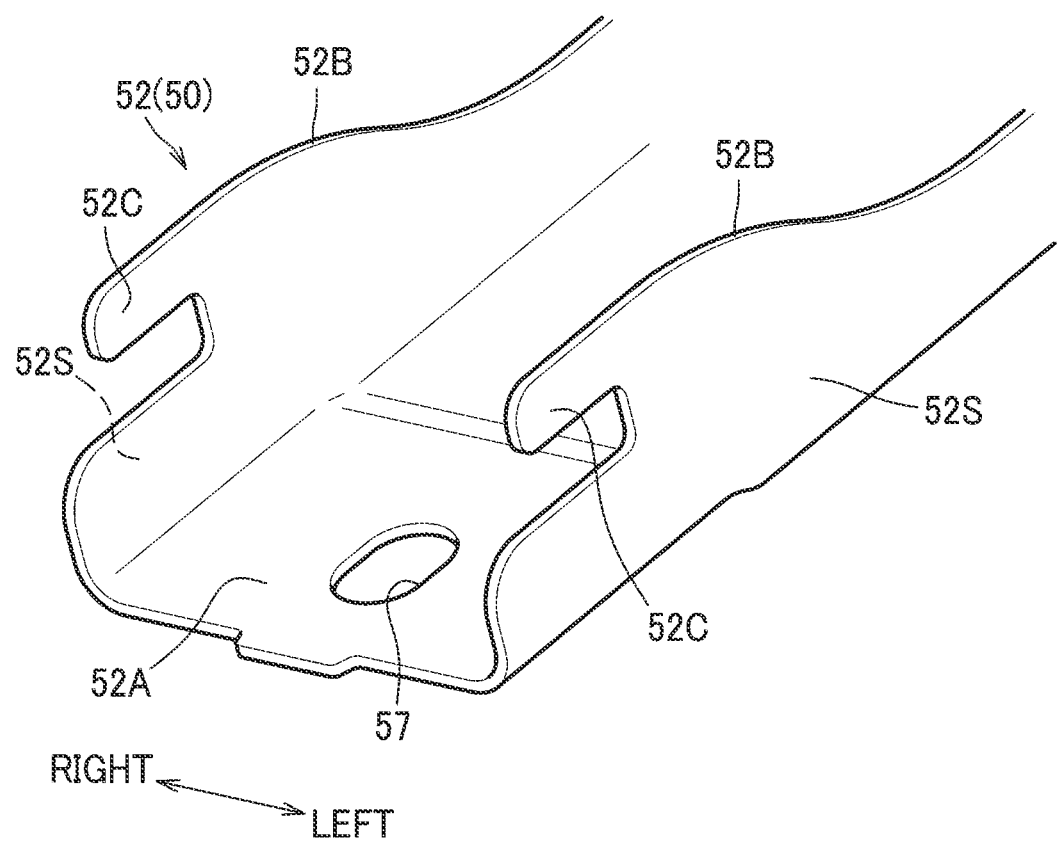

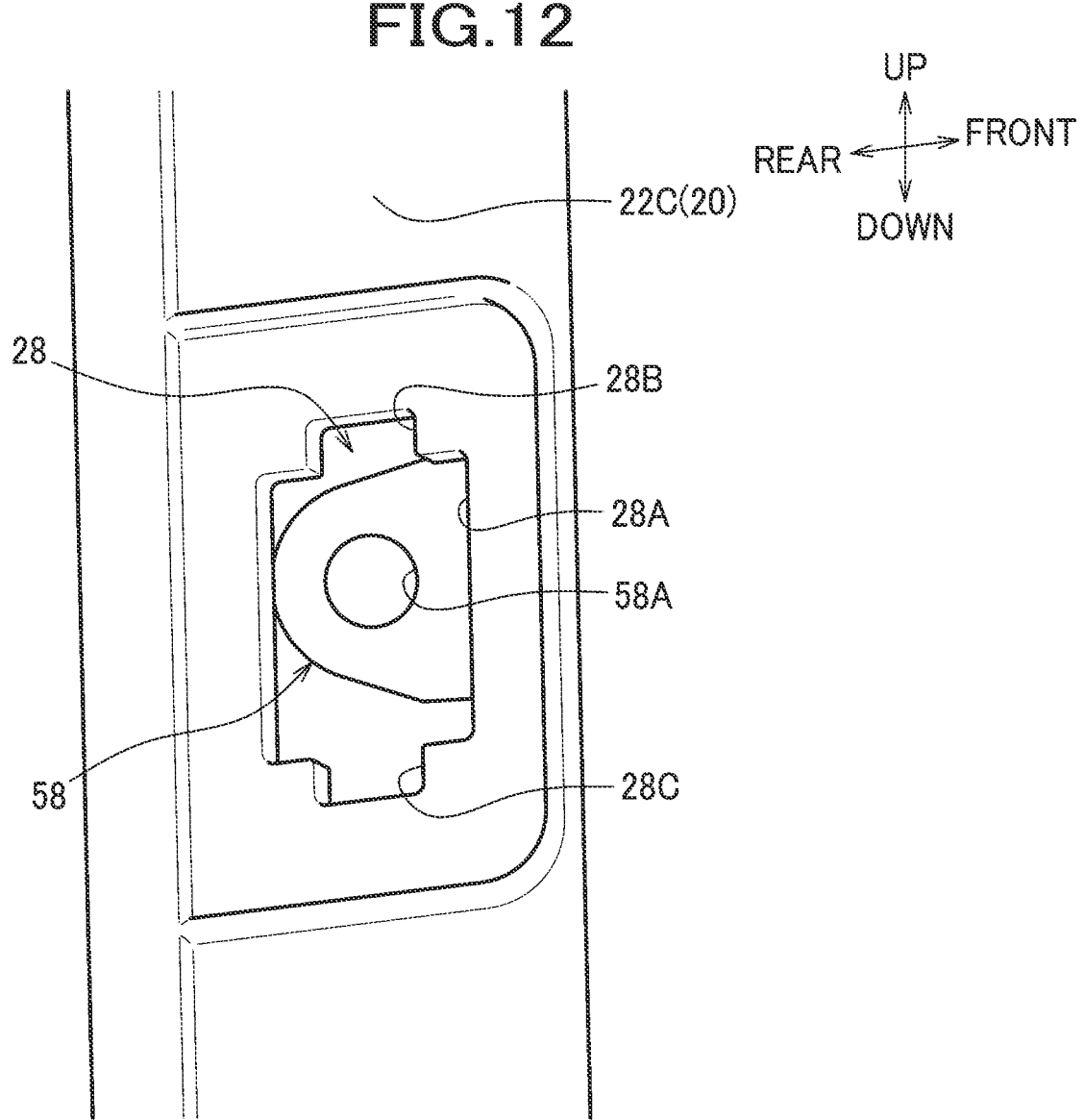

SIDE AIRBAG DEVICE AND VEHICLE

REFERENCE TO RELATED APPLICATIONS

This application claims priority from Japanese Patent Application No. 2022-205966 filed on Dec. 22, 2022, the disclosure of which is incorporated herein by reference in its entirety.

TECHNICAL FIELD

The present disclosure relates to a side airbag device and a vehicle.

BACKGROUND ART

A side airbag device known in the art includes a base member attached between a car body and a seat. The base member includes an airbag housing portion for containing an airbag module, and a retainer member for supporting the airbag housing portion (see JP2019-156173A). In such a side airbag device, the retainer member includes a retainer attaching portion having a fastening portion that is fastened to the car body.

DESCRIPTION

If the retainer attaching portion contacts the seat when the side airbag device is being fastened to the car body, or after the side airbag device is fastened to the car body, outer coverings, pads, etc. of the seat may be damaged.

Therefore, it would be desirable to provide a side airbag device and a vehicle configured to restrain contact of the retainer attaching portion and the seat.

Further, it would be desirable not to hinder the fastening of the retainer attaching portion.

It would also be desirable to simplify assembly of the side airbag device.

It would also be desirable to restrain the retaining attaching portion from becoming disengaged.

It would also be desirable to stably retain the retainer attaching portion.

It would also be desirable to increase the strength of the cover.

It would also be desirable to restrain rattling noise caused by contact of the retainer attaching portion and the seat.

A side airbag device is provided between a body and a seat of a vehicle. The side airbag device comprises an airbag module, a base member, and a retainer member. The airbag module includes an airbag and an inflator configured to supply the airbag with gas. The base member is disposed between the body and the seat, and includes an airbag housing portion configured to contain the airbag module. The retainer member supports the airbag housing portion. The retainer member includes a retainer body that supports the airbag housing portion and a retainer attaching portion extending downward from the retainer body. The retainer attaching portion includes a fastening portion that fastens the retainer member to the body or a frame of the seat. The base member includes a base member body in which the airbag housing portion is provided, and a cover extending from the base member body and located at a positon opposed to the retainer attaching portion. The cover extends from the base member body, in an extending direction that extends from the base member body, at least to a position where the fastening portion is disposed, and the cover covers the retainer attaching portion.

With the cover extending in the extending direction at least to the position where the fastening portion is disposed and covering the retainer attaching portion, contact of the retainer attaching portion and the seat can be restrained.

The cover may extend further, than the fastening portion, in the extending direction.

With the cover extending further in the extending direction than the fastening portion, contact of the retainer attaching portion and the seat can be further restrained.

The cover may cover at least a part of left and right side surfaces of the retainer attaching portion.

With the cover covering at least a part of the left and right side surfaces of the retainer attaching portion, contact of side surfaces of the retainer attaching portion and the seat can be restrained.

The cover may have an opening that exposes the entire fastening portion.

With the cover having the opening, the fastening of the attaching portion is not hindered.

The cover may have a first engaging portion, and the retainer attaching portion may have a second engaging portion configured to be engaged with the first engaging portion.

With the first engaging portion engaging the second engaging portion, the cover and the retainer attaching portion can be retained, and therefore assembly of the side airbag device can be made simpler.

One of the first engaging portion and the second engaging portion may be a hole and the other of the first engaging portion and the second engaging portion may be a protrusion engagable with the hole. The fastening portion may be a through hole, and the direction in which the protrusion protrudes and the direction in which the through hole penetrates may be non-parallel to each other.

With the direction in which the protrusion protrudes and the direction in which the through hole extends being non-parallel to each other, the engagement of the first engaging portion and the second engaging portion is less likely to be released when the retainer attaching portion (side airbag device) is fastened, and therefore the retainer attaching portion can be restrained from being disengaged from the cover.

The first engaging portion may be a hole, and the second engaging portion may be a protrusion engagable with the hole. The retainer attaching portion may have an attaching portion body including the fastening portion and left and right flanges extending upwards from left and right ends of the attaching portion body, and the protrusion may protrude from one of the flanges.

With the retainer attaching portion including the attaching portion body and the left and right flanges, the strength of the retainer attaching portion can be increased, and with the protrusion as the second engaging portion protruding from one of the flanges, the strength of the protrusion can be increased. Therefore, the retainer attaching portion can be stably retained to the cover.

The cover may include a plurality of ribs, and at least one of the plurality of ribs may be in contact with the retainer attaching portion.

With the cover including the plurality of ribs, the strength of the cover can be increased. Also, with at least one of the plurality of ribs contacting the retainer attaching portion, rattling noise can be restrained.

The cover may include a bottom wall portion, and left and right side portions may extend upward from left and right ends of the bottom wall portion, and the plurality of ribs may extend along one of the left and right side portions, the bottom wall portion, and the other of the left and right side portions.

With the cover including the bottom wall portion and the left and right side portions, and the plurality of ribs extending along one of the left and right side portions, the bottom wall portion, and the other of the left and right side portions, the strength of the cover can be increased.

A vehicle may comprise a body, a seat, and the side airbag device described above.

With the vehicle comprising the side airbag device described above, the retainer attaching portion and the seat can be restrained from contacting each other.

The above aspects, other advantages and further features will become more apparent by describing in detail illustrative, non-limiting embodiments thereof with reference to the accompanying drawings, in which:

FIG. 6 is a perspective view showing a cover of a base member and a retainer attaching portion of a retainer attaching member.

FIG. 12 is a diagram showing a state in which a second fastening portion is exposed by a second opening of the cover.

Hereinafter, a detailed description of an embodiment will be given with reference made to the drawings.

Figure 1:
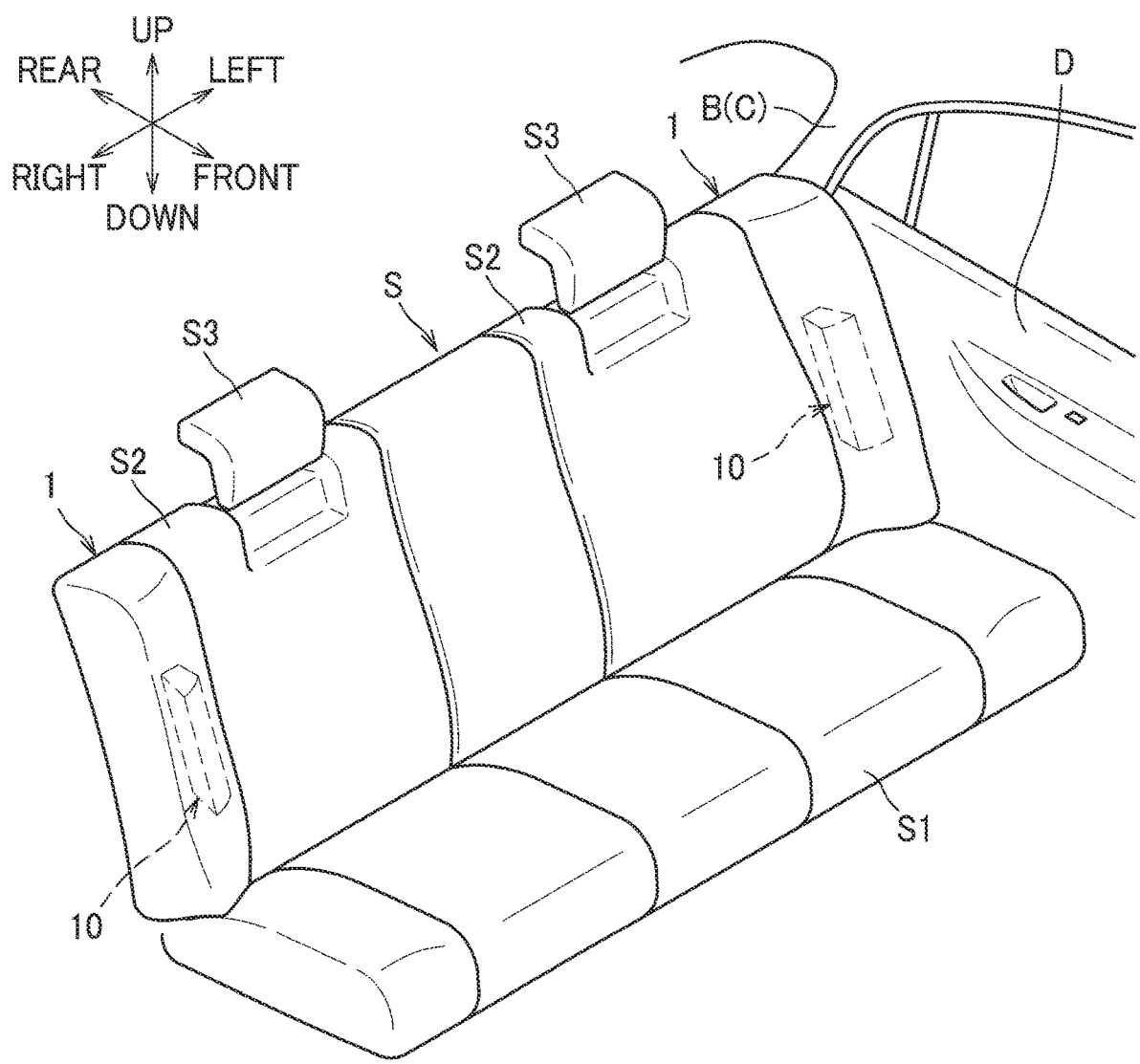
FIG. 1 is a perspective view of a car provided with a side airbag device according to an embodiment, as viewed from an interior of the car.

As shown in FIG. 1, a vehicle according to the embodiment is an automobile C which is an example of a car, and comprises a body B, a seat S, and a side airbag device 1. In this specification, the descriptions front/rear (frontward/rearward), left/right (leftward/rightward; lateral), and up/down (upward/downward; upper/lower) are based on directions as viewed from an occupant seated on the seat S.

The seat S is, for example, a back seat of the automobile C, and comprises a seat cushion S1, a seat back S2, and a headrest S3. The seat cushion S1 is configured by covering a seat cushion frame (not shown) with a seat cushion pad and a seat cushion outer covering. The seat back S2 is configured by covering a seat back frame (not shown) with a seat back pad and a seat back outer covering.

The side air bag device 1 is disposed between a body B and a seat S of the automobile C. In the present embodiment, the side airbag device 1 is disposed between a door D, which is a part constituting the body B, and the seat back S2 of the seat S. One side airbag device 1 is disposed at each of the left and right sides of the seat S. The left and right side airbag devices 1 are symmetrical. Hereafter, the side airbag device 1 will be described with reference to the left side air bag device 1.

Figure 2:
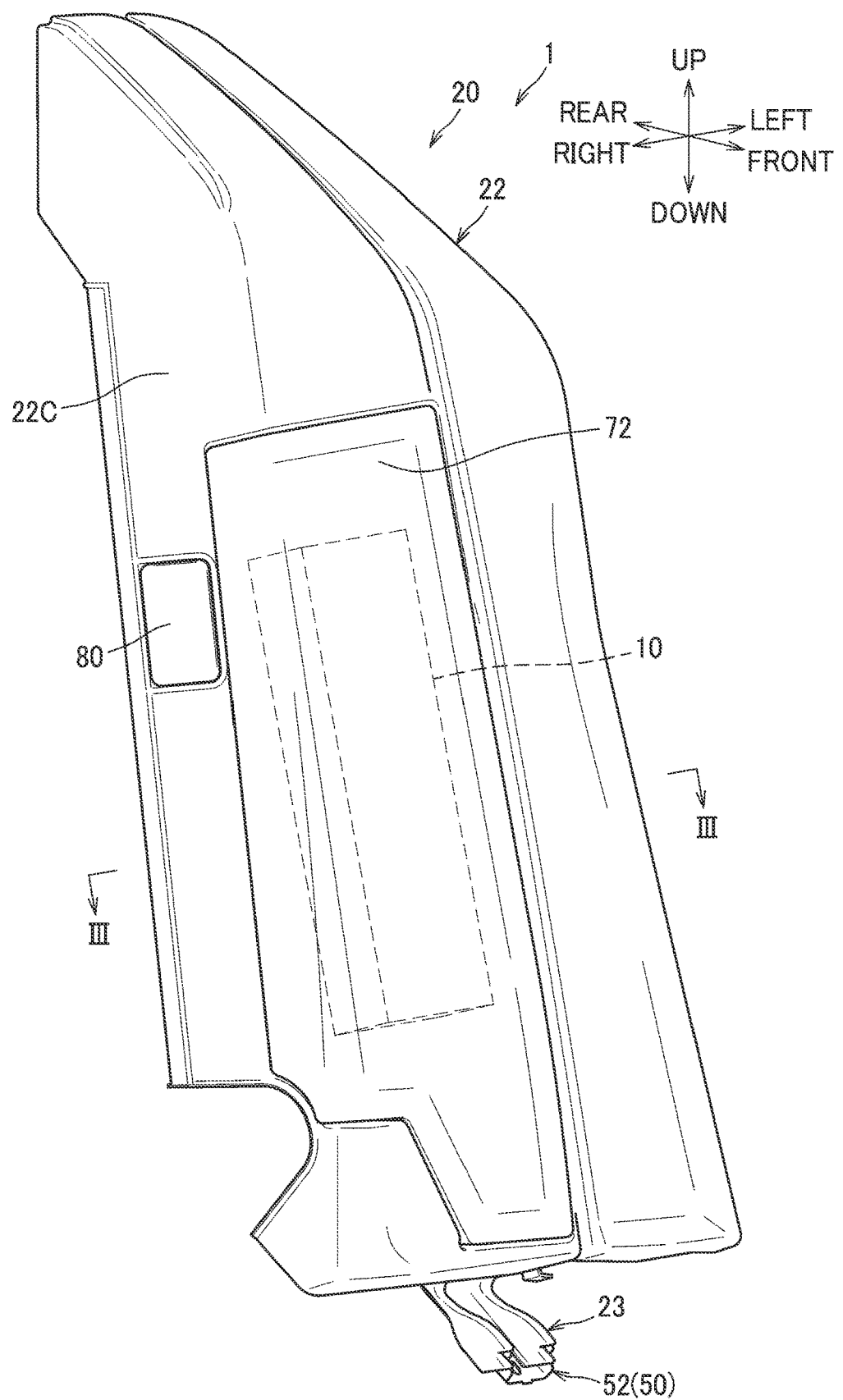
FIG. 2 is a perspective view of the side airbag device.
Figure 3:
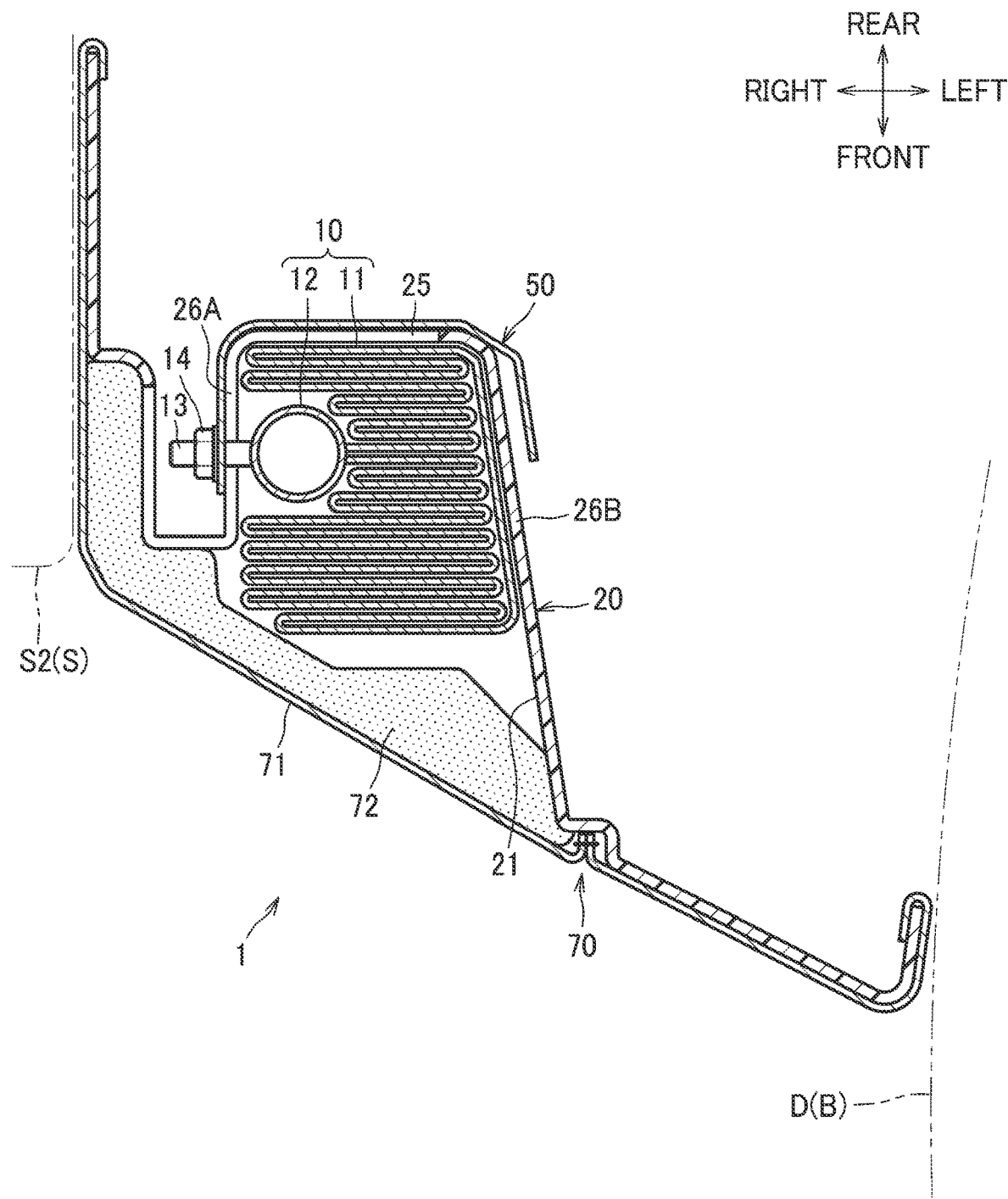
FIG. 3 is a cross-sectional view of the side airbag device taken along line III-III of FIG. 2.

As shown in FIG. 2 and FIG. 3, the side airbag device 1 comprises an airbag module 10, a base member 20, a retainer member 50, an outer covering material 71, and a pad 72. The outer covering material 71 is not shown in FIG. 2.

As shown in FIG. 3, the airbag module 10 includes an inflatable bag as an airbag 11, and an inflator 12 configured to supply the airbag 11 with gas.

The inflator 12 is a gas generating device having an approximately cylindrical-shape elongated in the up-down direction. The inflator 12 has two bolts 13 protruding outward and aligned in the up-down direction, i.e. the longitudinal direction of the inflator 12. The inflator 12 is fixed to the retainer member 50 by inserting the two bolts 13 in bolt insertion holes 55 (refer to FIG. 4) of the retainer member 50 and fastening the bolts 13 to nuts 14.

The air bag 11 is folded and disposed around the inflator 12. When the side airbag device 1 is activated, the airbag 11 is inflated by gas generated by the inflator 12, and the airbag 11 ruptures a rupture portion 70 of the outer covering material 71, wherein the airbag 11 is deployed to the front of the base member 20, i.e. the lateral side of the occupant seated in the seat S.

Figure 4:
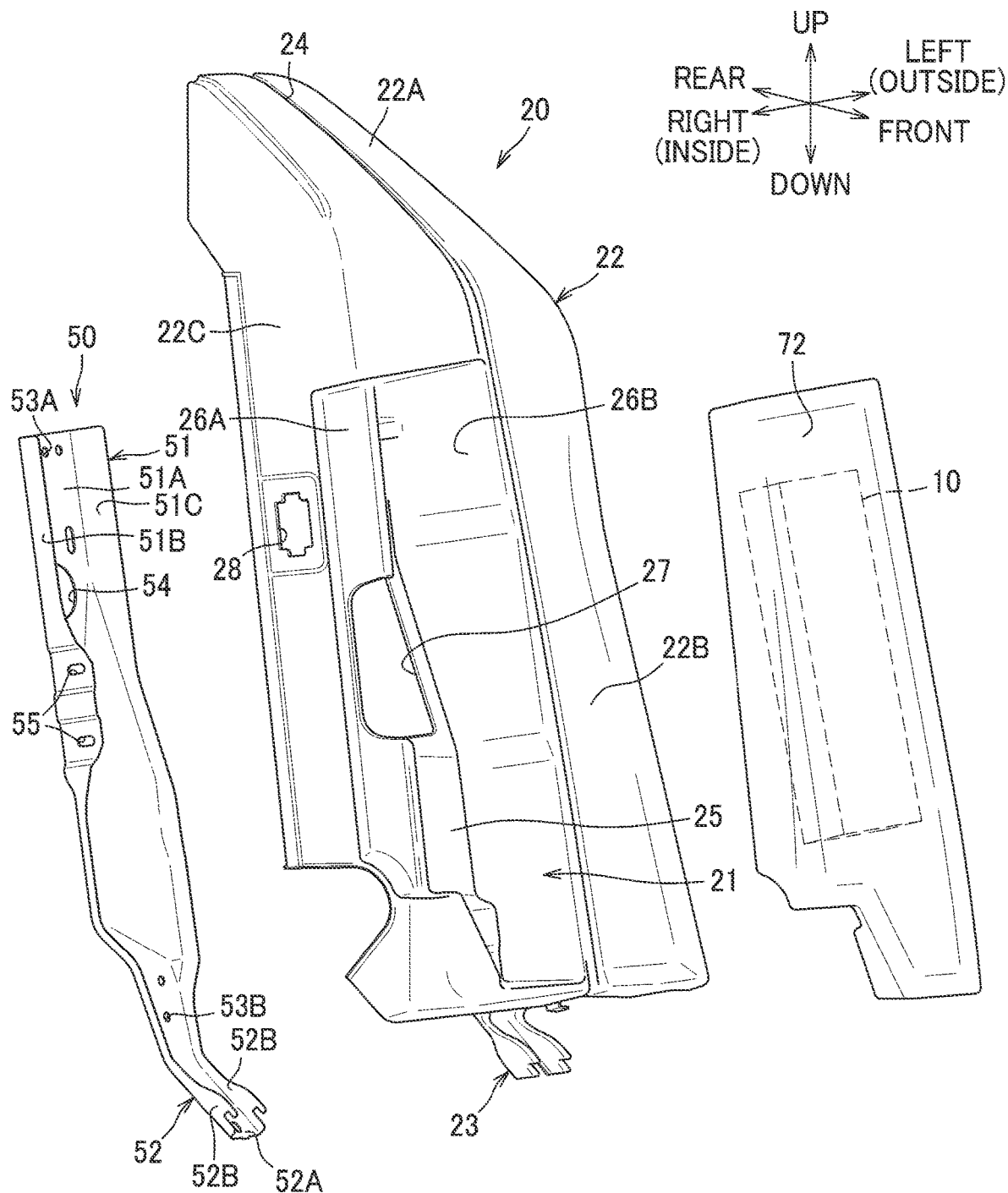
FIG. 4 is an exploded perspective view of the side airbag device.
Figure 5:
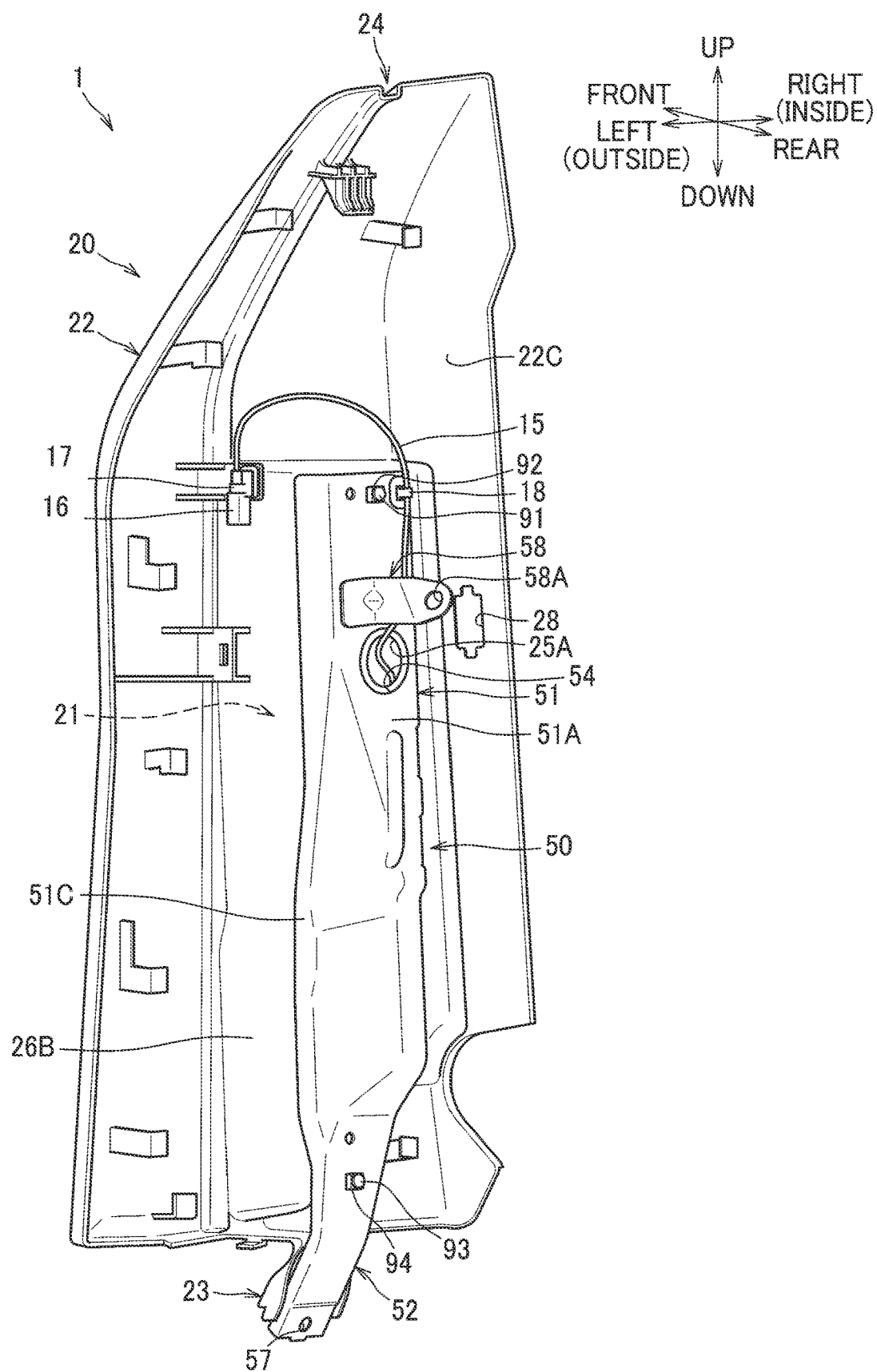
FIG. 5 is a perspective view of the side airbag device as viewed from the rear.

The base member 20 is formed from plastic, and is disposed between the door D constituting the body B and the seat back S2 of the seat S. The base member 20 includes an airbag housing portion 21 for containing the airbag module 10. As shown in FIG. 4 and FIG. 5, the base member 20 includes a base member body 22 and a cover 23. The airbag housing portion 21 is provided in the base member body 22. The cover 23 extends downward from the base member body 22.

The base member body 22 includes a base upper wall portion 22A, a base front wall portion 22B, and a base side wall portion 22C. The base front wall portion 22B extends downward from a front end of the base upper wall portion 22A. The base side wall portion 22C extends rearward from a laterally inner end of the base front wall portion 22B. An upper end of the base side wall portion 22C is connected to a laterally inner end of the base upper wall portion 22A. A laterally inner side is the side of the side airbag device 1 in the lateral direction at which the seat S is positioned, and a laterally outer side is the side of the side airbag device 1 in the lateral direction at which an adjacent door D is positioned. The laterally inner side is the right side of the left side airbag device 1 and the laterally outer side is the left side of the left side airbag device 1.

The base member body 22 includes a tuck-in groove 24 that extends in the up-down direction from a rear end of the base upper wall portion 22A to a lower end of the base front wall portion 22B. The tuck-in groove 24 is a groove for tucking in the outer covering material 71 (refer to FIG. 3).

The airbag housing portion 21 is formed as a recess, extending towards the rear with respect to the front surface of the base front wall portion 22B. The airbag housing portion 21 is provided adjacently to a laterally inner side of the tuck-in groove 24. The airbag housing portion 21 includes a bottom portion 25 that forms a back wall of the airbag housing portion 21, a first side wall portion 26A that extends frontward from the laterally inner end of the bottom portion 25, and a second side wall portion 26B that extends frontward from the laterally outer end of the bottom portion 25.

A harness insertion hole 25A is formed on the bottom portion 25 (refer to FIG. 5). The harness insertion hole 25A is a through hole for passing an harness 15, extending from the airbag module 10, from front side to a back side of the bottom portion 25. An opening 27 is also formed in the base member 20 in an area that extends from the bottom portion 25 to the first side wall portion 26A. The harness insertion hole 25A is disposed above the opening 27.

As shown in FIG. 3, the side airbag device 1 is configured by disposing the airbag module 10 inside the airbag housing portion 21, positioning the pad 72 to cover the airbag module 10 from the front, and covering the base member 20 and the pad 72 with the outer covering material 71.

Specifics of the cover 23 provided on the base member 20 will be described later.

As shown in FIG. 4 and FIG. 5, the retainer member 50 is made from a metal plate, and supports the airbag housing portion 21 of the base member 20 from the rear. The retainer member 50 includes a retainer body 51 that supports the airbag housing portion 21, and a retainer attaching portion 52 extending downward from the retainer body 51. In the present embodiment, the retainer body 51 and the retainer attaching portion 52 are integrally formed.

The retainer body 51 includes a retainer rear wall portion 51A opposed to the bottom portion 25 of the airbag housing portion 21, a first retainer side wall portion 51B extending frontward from a laterally inner end of the retainer rear wall portion 51A, and a second retainer side wall portion 51C extending frontward from a laterally outer end of the retainer rear wall portion 51A.

The retainer rear wall portion 51A has a first retainer through hole 53A formed on an upper end portion, a second retainer through hole 53B formed at a lower end portion, and a harness insertion hole 54 formed between the first retainer through hole 53A and the second retainer through hole 53B. The first retainer side wall portion 51B has two bolt insertion holes 55 aligned in the up-down direction.

The airbag housing portion 21 has a first cover through hole, not shown in the drawings, in an upper end portion of the bottom portion 25, at a position opposed to the first retainer through hole 53A. An upper portion of the retainer member 50 and the base member 20 are fixed to each other by inserting a bolt 93 through the first cover through hole of the base member 20 and the first retainer through hole 53A of the retainer member 50, and fastening a nut 94 to the bolt 93.

The airbag housing portion 21 also has a second cover through hole, not shown in the drawings, in a lower end portion of the bottom portion 25, at a position opposed to the second retainer through hole 53B. A lower portion of the retainer member 50 and the base member 20 are fixed to each other by inserting a bolt 93 through the second cover through hole of the base member 20 and the second retainer through hole 53B of the retainer member 50, and fastening the nut 94 to the bolt 93.

The harness insertion hole 54 is a through hole formed at a position opposed to the harness insertion hole 25A for passing the harness 15 from a front side to a rear side of the retainer rear wall portion 51A. The harness 15 is a harness for inputting an activation signal to the inflator 12. One end of the harness 15 is connected to the inflator 12 (refer to FIG. 3), and the other end of the harness 15 is connected to the connector 16. The connector 16 is retained to the base member 20 by a clip 17, and a middle portion of the harness 15 is retained to the retainer member 50 by a clip 18.

As shown in the enlarged view of the retainer member 50 in FIG. 6, the retainer member 50 includes an attaching portion body 52A, left and right flanges 52B, and left and right protrusions 52C as second engaging portions.

The attaching portion body 52A is formed such that the attaching portion body 52A extends obliquely frontward and downward continuously from a lower end of the retainer rear wall portion 51A. The attaching portion body 52A of the retainer attaching portion 52 has a first fastening portion 57 as a fastening portion thereof. The first fastening portion 57 is a through hole through which fasteners such as bolts and rivets are inserted, and is fastened to the body B of the automobile C or a frame of the seat S by the fastener. For example, the first fastening portion 57 is fastened to a tire housing which constitutes the body B or a seat cushion frame of the seat cushion S1 which constitutes the frame of the seat S, by fastening nuts to bolts, rivets, and the like.

The flanges 52B are formed to extend upwards from the left and right ends of the attaching portion body 52A. As shown in FIG. 4, the laterally-inner flange 52B is formed continuously from the lower end of the first retainer side wall portion 51B, and the laterally-inner flange 52B is formed to extend continuously from the lower end of the second retainer side wall portion 51C.

As shown in FIG. 6, the protrusions 52C protrude from the flanges 52B. Specifically, the protrusions 52C protrude from upper end portions of the flanges 52B, in a direction approximately parallel to a direction in which the retainer attaching portion 52 extends from the retainer body 51. A direction in which the protrusions 52C extend and a direction in which the first fastening portion 57, which is a through hole, extends, are non-parallel to each other. In the present embodiment, the direction in which the protrusions 52C extend is approximately perpendicular to the direction in which the first fastening portion 57 extends. The protrusions 52C as second engaging portions engage holes 233 provided in the base member 20 as first engaging portions.

As shown in FIG. 2 and FIG. 5, the cover 23 of the base member 20 extends from the base member body 22, and is opposed to the retainer attaching portion 52 of the retainer member 50 such that the cover 23 overlaps the retainer attaching portion 52. As shown in the enlarged view of FIG. 7, the cover 23 covers the retainer attaching portion 52. Specifically, the cover 23 covers a part of the front surface 52F of the retainer attaching portion 52. The cover 23 also covers parts of the left and right side surfaces 52S of the retainer attaching portion 52.

Figure 8:
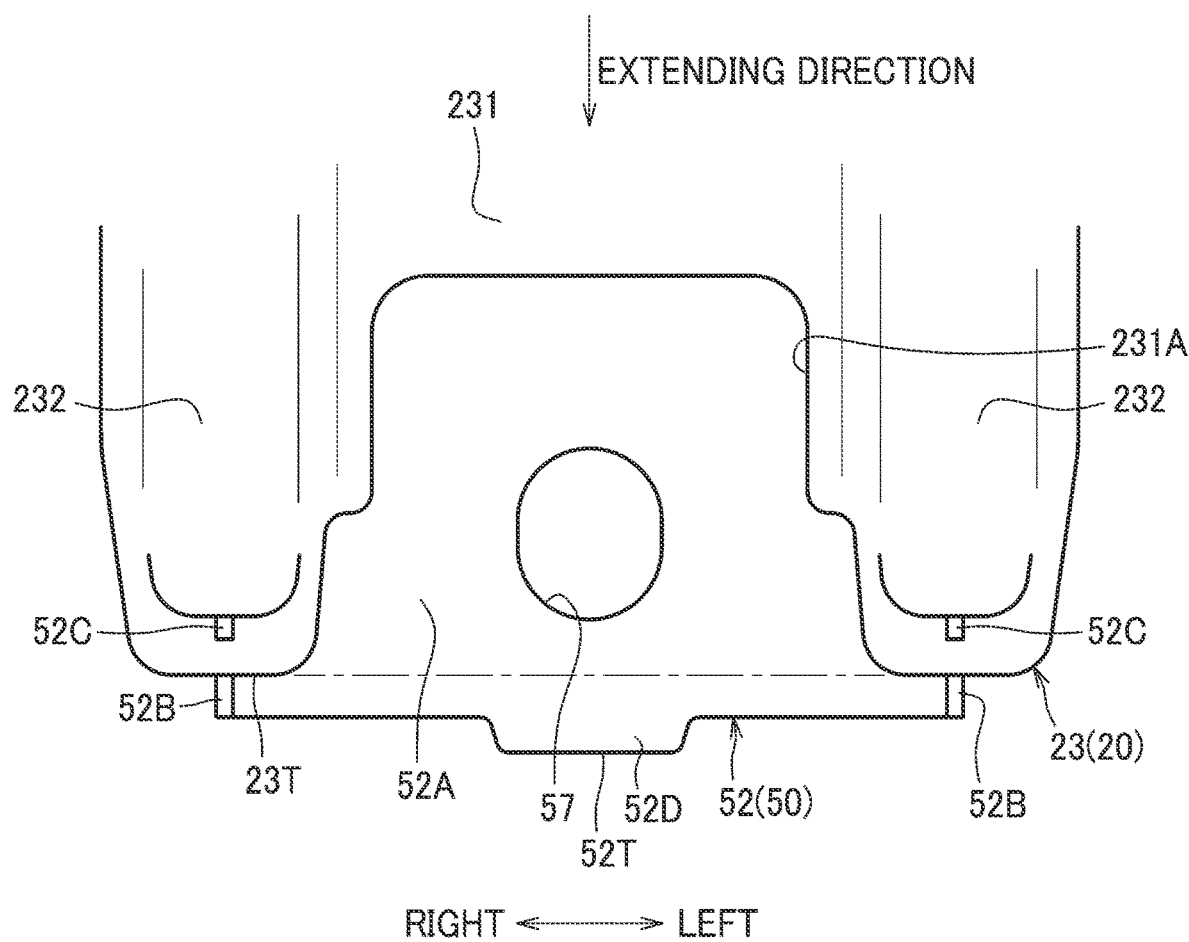
FIG. 8 is a diagram of the cover and the retainer attaching portion as viewed from a direction in which the first fastening portion (through hole) penetrates.

As shown in FIG. 8, the cover 23 extends in an extending direction at least to a position in which the first fastening portion 57 is disposed. The extending direction is a direction in which the cover 23 extends from the base member body 22 (refer to the arrow in FIG. 8). In the present embodiment, the cover 23 extends further in the extending direction than the first fastening portion 57. Specifically, the cover 23 extends such that an end 23T thereof is positioned closer, than the first fastening portion 57, to an end 52T of the retainer attaching portion 52.

Figure 7:
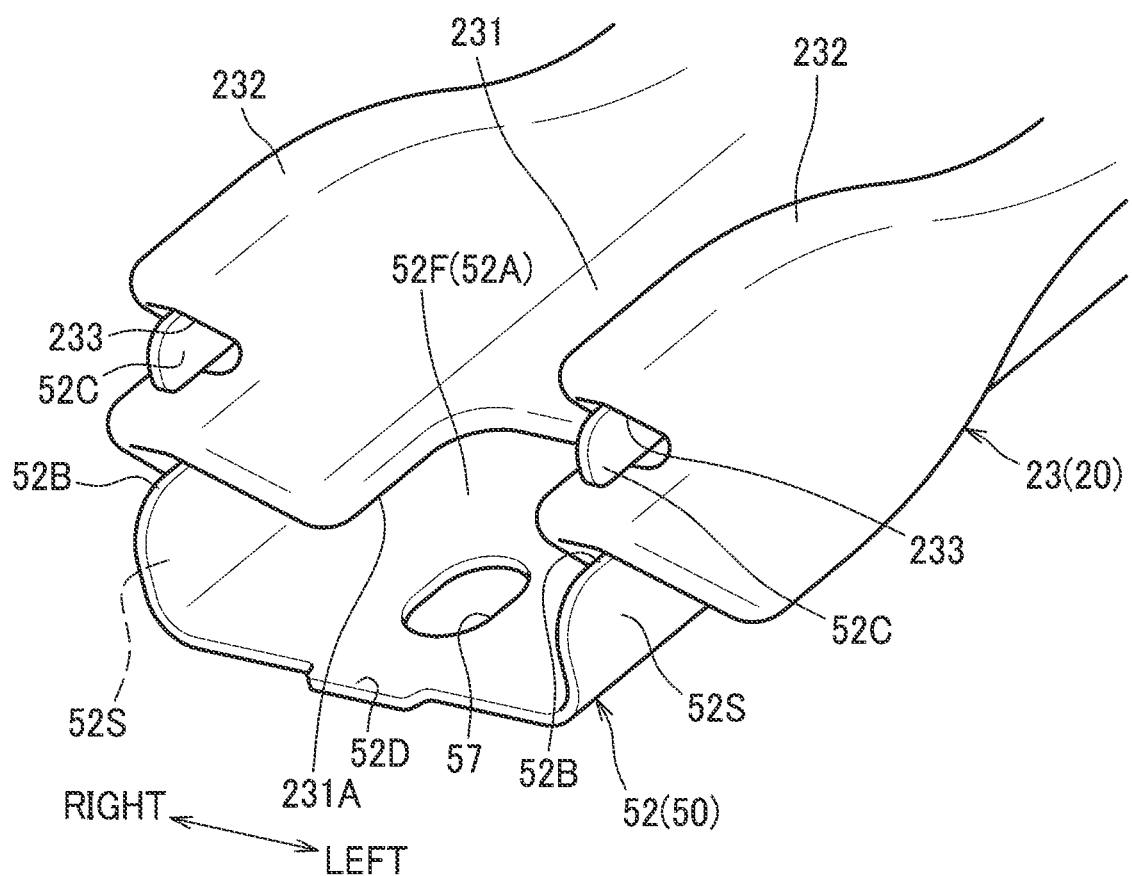
FIG. 7 is a perspective view showing the cover and the retainer attaching portion in an engaged state.

As shown in FIG. 7 and FIG. 8, the cover 23 includes a bottom wall portion 231, left and right side portions 232, and a hole 233 as a first attaching portion.

The bottom wall portion 231 extends from a lower end of the base member body 22 (refer to FIG. 2) in the extending direction. In the present embodiment, the bottom wall portion 231 extends from the lower end of the base member body 22 in an obliquely frontward and downward direction. The bottom wall portion 231 has at its end portion a first opening 231A as an opening.

The first opening 231A is an opening that exposes the entire first fastening portion 57 of the retainer attaching portion 52, and is formed as a recess shape having a recess extending in a direction opposite to the extending direction. The first opening 231A exposes the entire first fastening portion 57, and a part of the attaching portion body 52A surrounding the first fastening portion 57. The part of the attaching portion body 52A surrounding the first fastening portion 57 is a part that contacts a head of a fastener, such as a bolt or a rivet, inserted into the first fastening portion 57.

The retainer attaching portion 52 has a protrusion 52D with an approximately trapezoid shape protruding in the extending direction, which is formed at a laterally central portion of an end portion of the retainer attaching portion body. The protrusion 52D is formed to provide a sufficient length (of the retainer attaching portion 52) from the first fastening portion 57 to the end 52T of the retainer attaching portion 52 in the extending direction, in the portion surrounding the first fastening portion 57, and obtain a sufficient area of contact between the head of the fastener inserted into the first fastening portion 57 and the retainer attaching portion 52 (retainer attaching portion body 52A). Therefore, the first fastening portion 57 (retainer attaching portion 52) can be firmly fastened to the body B of the automobile C or the frame of the seat S.

Figure 9:
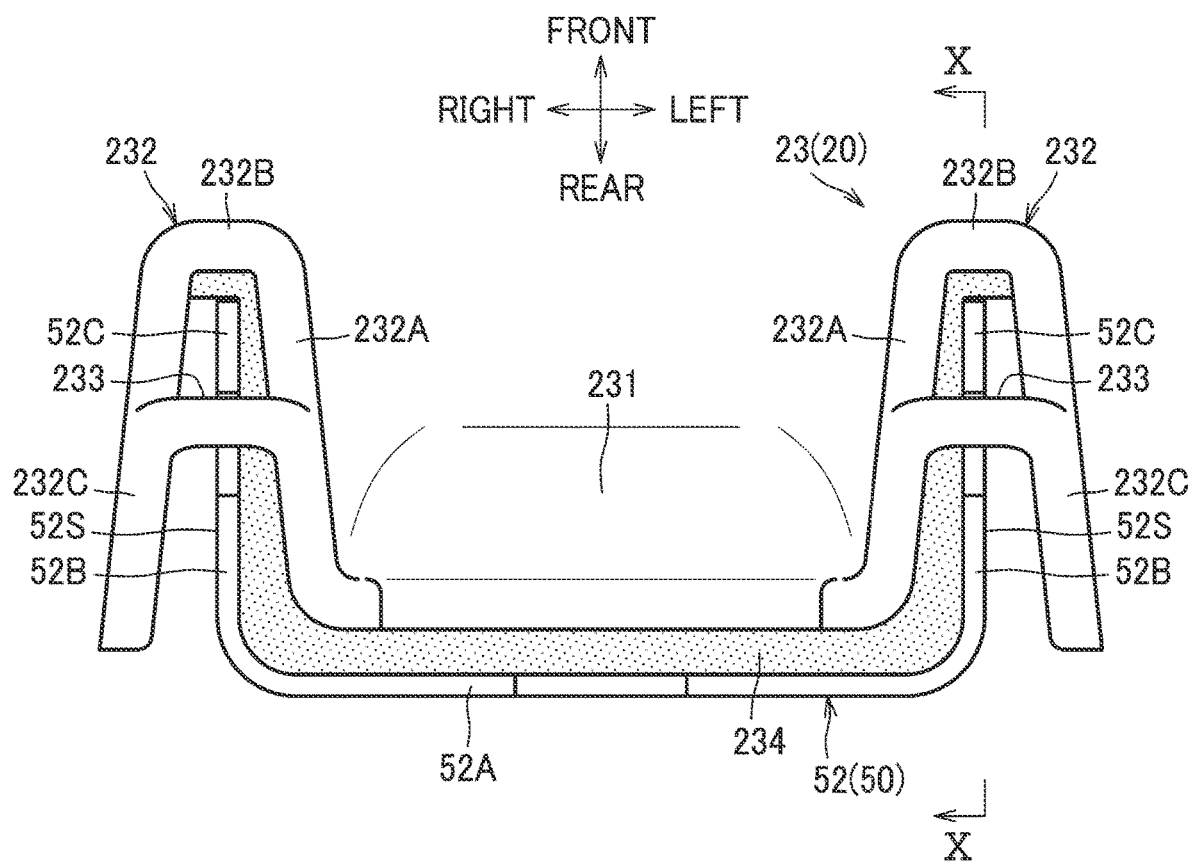
FIG. 9 is a diagram of the cover and the retainer attaching portion as viewed from an end-portion side of the cover and the retainer attaching portion.

As shown in FIG. 9, the side portions 232 are formed such that the side portions 232 extend upwards from the left and right ends of the bottom wall portion 231. Each of the left and right side portions 232 are formed in a shape having a cross-section that is approximately U-shaped, having an inner side wall portion 232A extending upwards from left and right ends of the bottom portion 231, a front side wall portion 232B extending in a laterally outer direction from a front end of the inner side wall portion 232A, and an outer side wall portion 232C extending in a rearward direction from an laterally outer end of the front side wall portion 232B.

In a state in which the cover 23 and the retainer attaching portion 52 are engaged, a part of the left flange 52B of the retainer attaching portion 52 is disposed between the left inner side wall portion 232A and the left outer side wall portion 232C of the cover 23 in the lateral direction. Also, in the state in which the cover 23 and the retainer attaching portion 52 are engaged, a part of the right flange 52B of the retainer attaching portion 52 is disposed between the right inner side wall portion 232A and the right outer side wall portion 232C of the cover 23 in the lateral direction.

As shown in FIG. 8, the bottom wall portion 231 and the left and right side portions 232 of the cover 23 covers a part of the retainer attaching portion body 52A and a part of the left and right flanges 52B of the retainer attaching portion 52 from the front side. Also, as shown in FIG. 9, the outer side wall portions 232C of the left and right side portions 232 of the cover 23 covers a part of the left and right side surfaces 52S (flanges 52B) of the retainer attaching portion 52 from the laterally outer sides.

Figure 10:
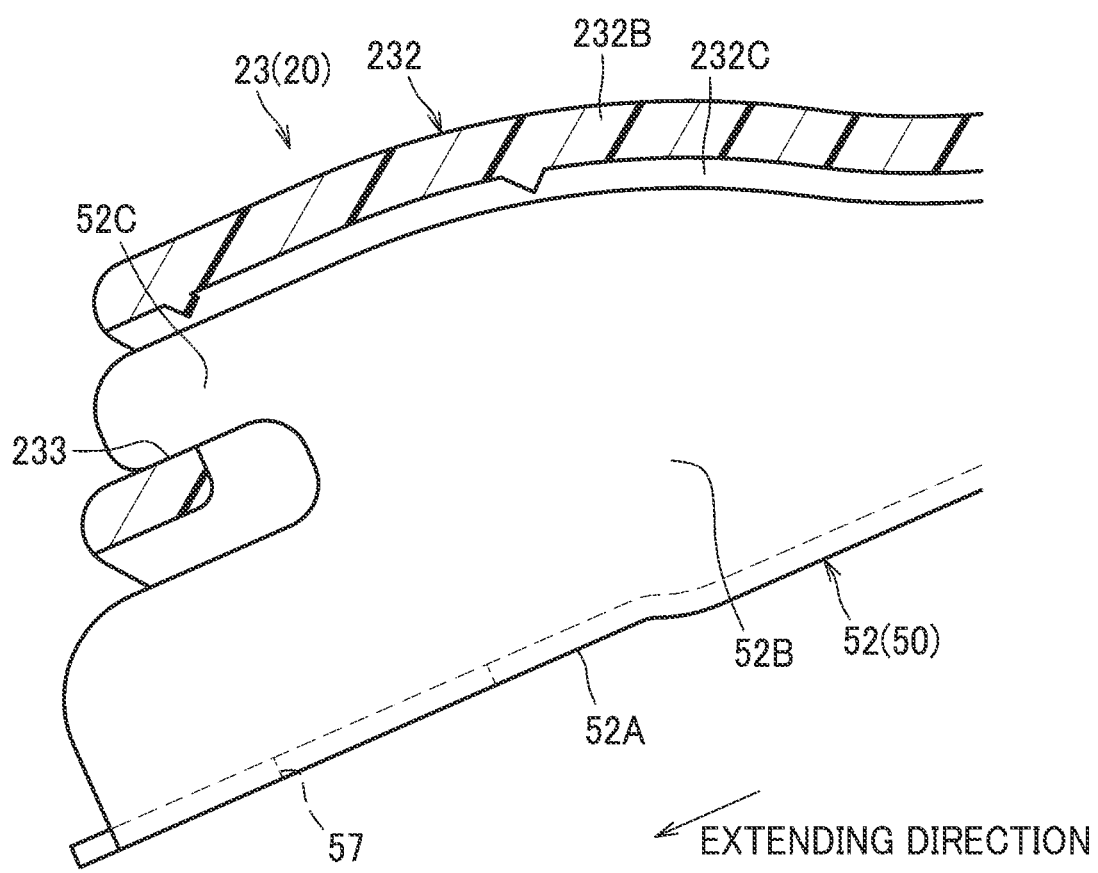
FIG. 10 is a cross-sectional view of FIG. 9 taken along line X-X.

As shown in FIG. 9 and FIG. 10, the holes 233 are through holes that penetrate the side portion 232 in the extending direction, provided at end portions of the left and right side portions 232. The protrusions 52C can be inserted and engaged to the holes 233 in the extending direction. The cover 23 and the retainer attaching portion 52 can be retained by the engagement of the holes 233 and the protrusions 52C.

As described above, in the present embodiment, the direction in which the protrusion 52C extends is approximately perpendicular to the direction in which the first fastening portion 57 penetrates the retainer member 50. Therefore, the direction in which the protrusion 52C is inserted into the hole 233 is different from the direction in which a fastener such as a bolt or a rivet pass through the first fastening portion 57 (i.e., the direction in which the retainer attaching portion 52 is attached to the body B or the frame of the seat S).

Figure 11:
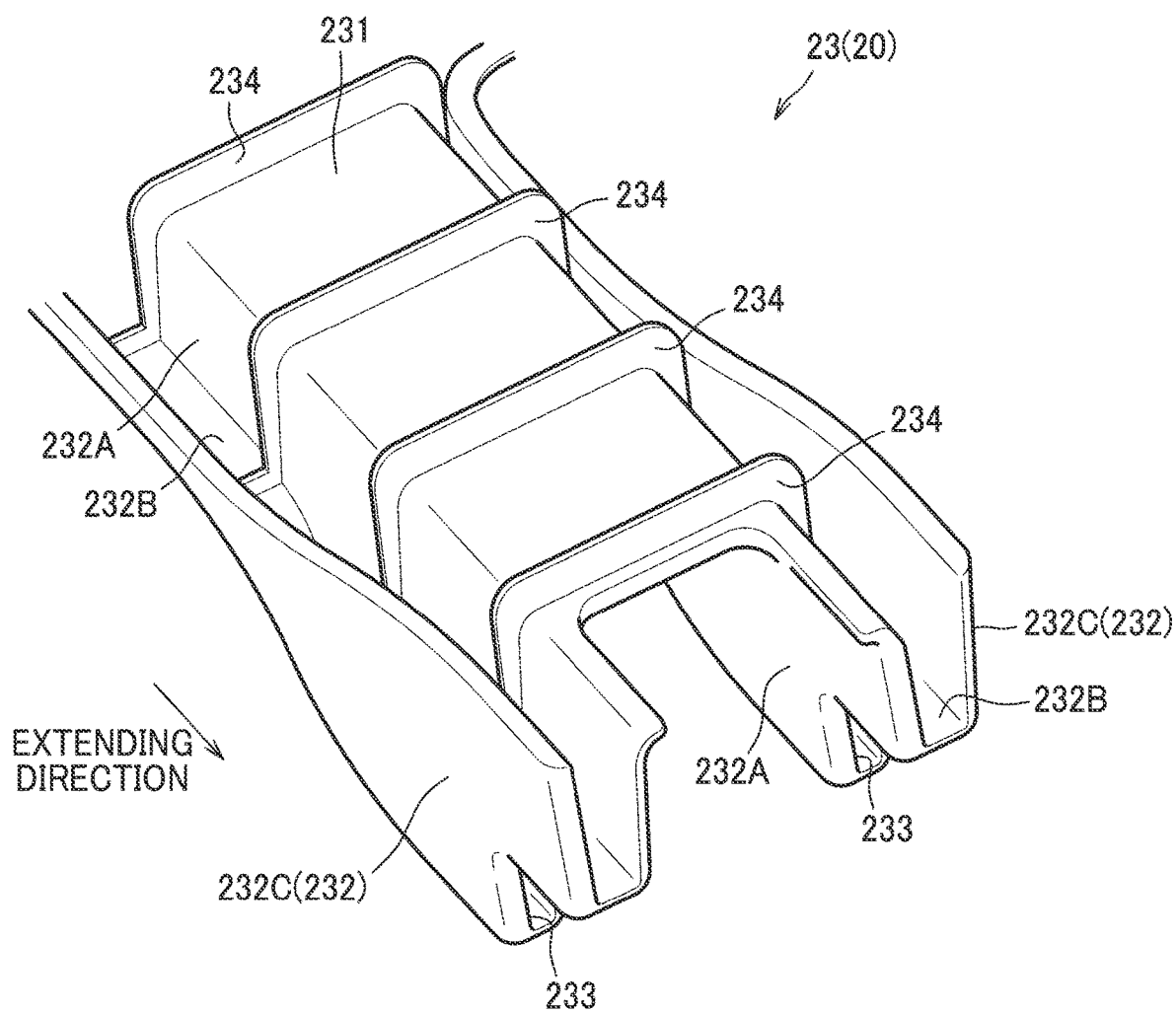
FIG. 11 is a perspective view of the cover as viewed from a back side.

As shown in FIG. 9 and FIG. 11, the cover 23 includes a plurality of ribs 234. In FIG. 9, the ribs 234 are shaded with dot hatching to clearly distinguish the ribs 234. The plurality of ribs 234 is provided such that the ribs 234 mainly extend in the lateral direction. In the present embodiment, each of the four ribs 234 is spaced apart from an adjacent rib 234 by a given distance in the extending direction.

The plurality of ribs 234 extends from one side portion 232, along the bottom wall portion 231, to the other side portion 232. Specifically the plurality of ribs 234 is formed in an approximately U-shape that extends along one of the left and right inner side wall portions 232A, the bottom wall portion 231, and the other of the left and right outer side wall portions 232A.

The plurality of ribs 234 is in contact with the retainer attaching portion 52. Specifically, the plurality of ribs 234 is in contact with the attaching portion body 52A and the flange 52B. The cover 23 is in contact with the attaching portion body 52A and the flange 52B at the plurality of ribs 234, and the cover 23 is spaced apart from the attaching portion body 52A and the flange 52B where the ribs 234 are not formed.

As shown in FIG. 5, a second fastening portion 58A is provided on the retainer body 51 of the retainer member 50. Specifically, the retainer member 50 includes a body attaching portion 58 made from a metal plate. A laterally outer end of the body attaching portion 58 is fixed to a part of the retainer body 51 above the harness insertion hole 54 by welding or the like, and the second fastening portion 58A is provided at a laterally inner end of the body attaching portion 58. The second fastening portion 58A is a through hole for inserting a fastener such as a bolt or a rivet, and is fastened to the body B of the automobile C by the fastener.

The base member 20 has a second opening 28. The second opening 28 is formed on the base side wall portion 22C at a position opposed to the second fastening portion 58A. The second opening 28 is a through hole that penetrates the base member 20 in the lateral direction, and, as shown in FIG. 12, exposes the second fastening portion 58A as viewed from the laterally inner side of the base side wall portion 22C such that the second fastening portion 58A can be fastened to the body B. When the second fastening portion 58 is fastened to the body B, tools for fastening the fastener is inserted through the second opening 28, and the second fastening portion 58A is fastened to the body B by the fastener.

The second opening 28 has an approximately cross-shape that is elongated in the up-down direction and symmetrical in both the up-down direction and the front-rear direction. Specifically, the second opening 28 has a broad portion 28A positioned in the middle in the up-down direction, a first narrow portion 28B in the form of a recess extending upward from an central position of the broad portion 28A in the front-rear direction, and a second narrow portion 28C in the form of a recess extending downward from the central positon of the broad portion 28A in the front-rear direction.

Figure 13A:
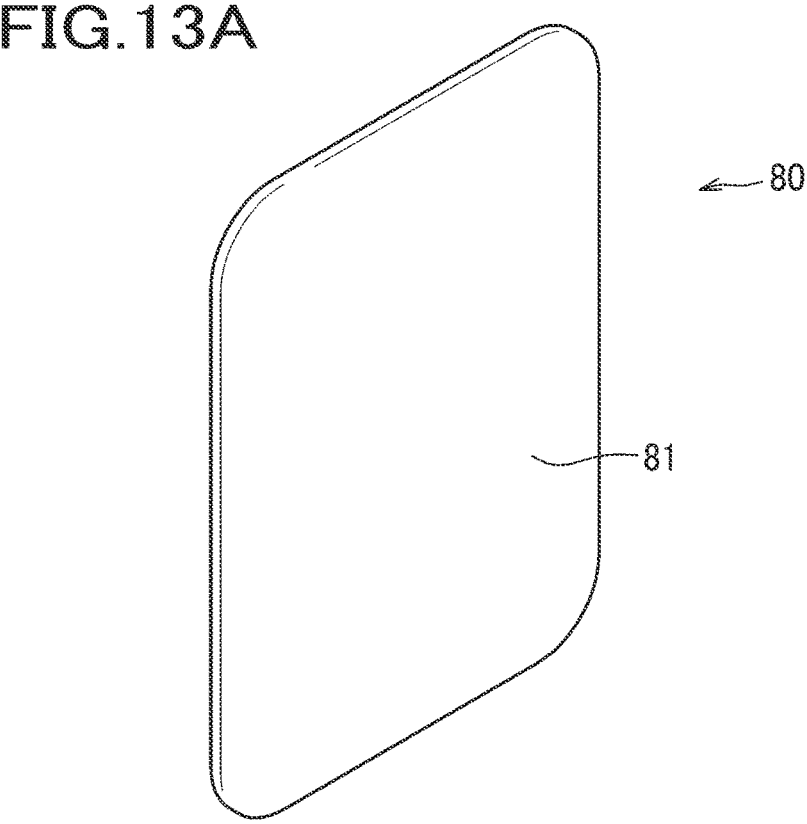
FIG. 13A is a perspective view of a cap in a first orientation as viewed from a front side.
Figure 13B:
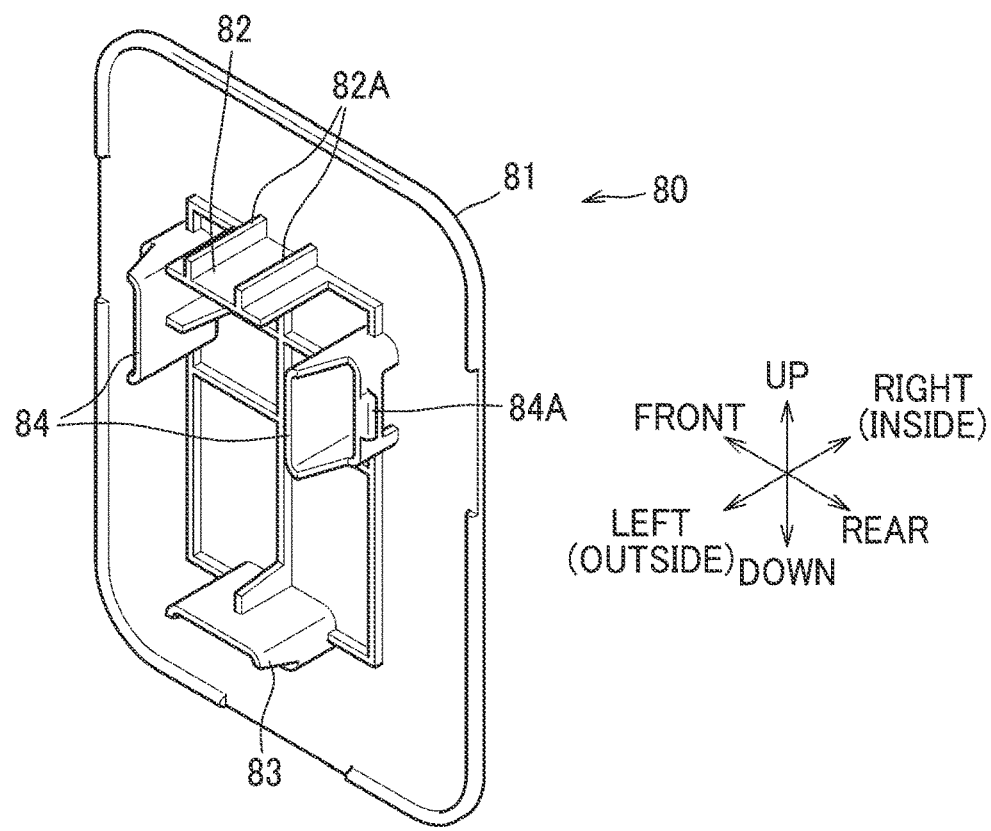
FIG. 13B is a perspective view of the cap in the first orientation as viewed from a back side.

As shown in FIG. 2, the side airbag device 1 further comprises a cap 80. The cap 80 is made of plastic. The cap 80 is engaged with the second opening 28 (refer to FIG. 4) of the base member 20 and covers the second opening 28. As shown in FIG. 13A and FIG. 13B, the cap 80 includes a cap body 81, a first protrusion 82, a second protrusion 83, and a pair of third protrusions 84.

The cap body 81 has an approximately rectangular plate-shape. The first protrusion 82, the second protrusion 83, and the third protrusions 84 protrude in a laterally outward direction from a central part of the cap body 81.

The first protrusion 82 has a plate-shape. The first protrusion 82 has two contacting portions 82A that contact an edge of the second opening 28 when the cap 80 is engaged with the second opening 28. The contacting portions 82A have rib-shapes elongated in the lateral direction.

The second protrusion 83 is opposed to and spaced apart from the first protrusion 82 by given distance in the up-down direction.

The third protrusions 84 are opposed to and spaced apart from each other by given distance in the front-rear direction. The pair of third protrusions 84 is provided at a position between the first protrusion 82 and the second protrusion 83 in the up-down direction. The pair of third protrusions 84 is provided at a position closer to the first protrusion 82 than to the second protrusion 83, in the up-down direction.

Figure 14A:
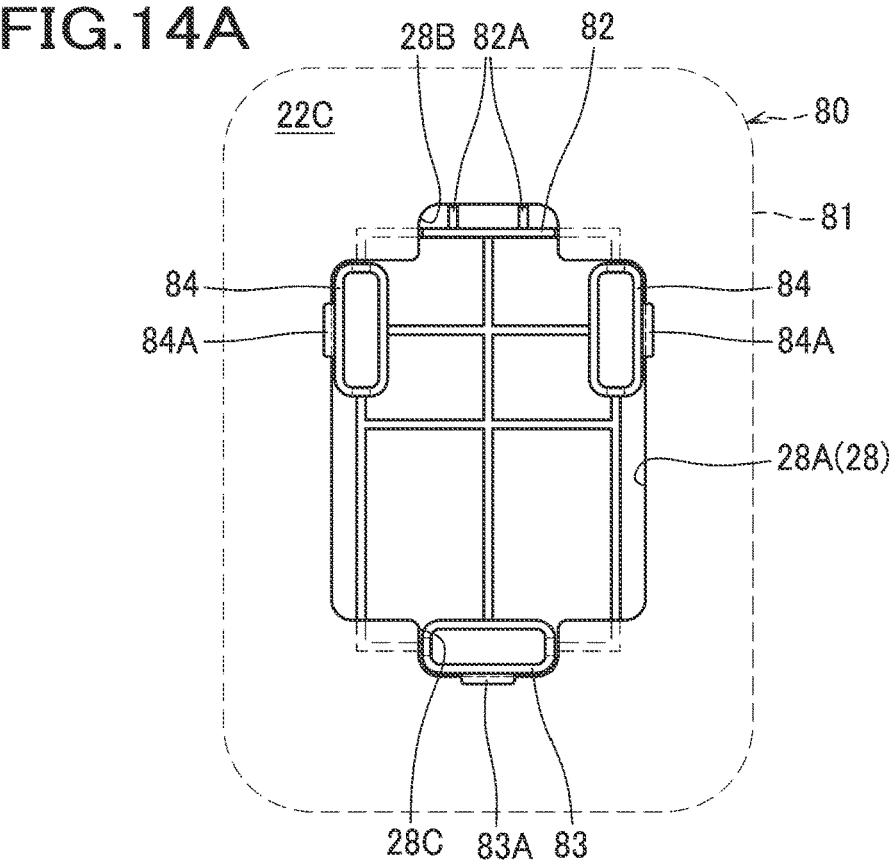
FIG. 14A is a diagram of the cap in the first orientation engaging the second opening as viewed from an inner side of the side airbag device.
Figure 14B:
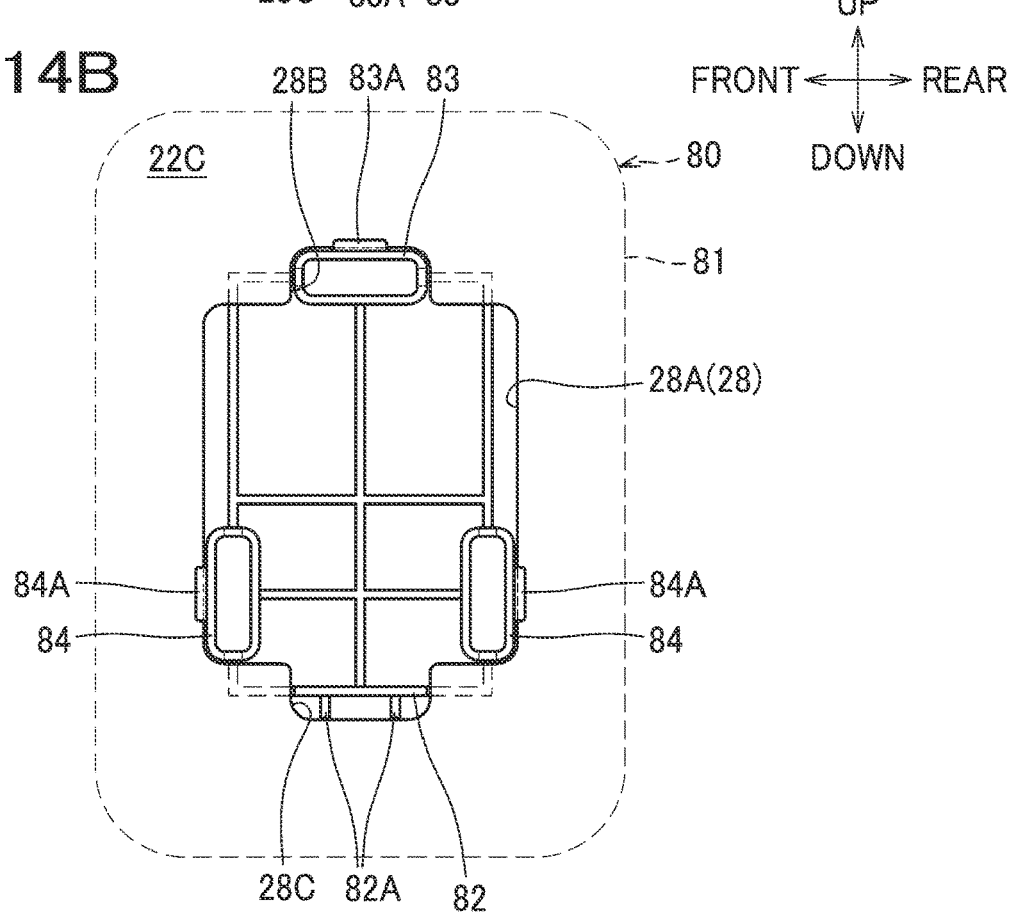
FIG. 14B is a diagram of the cap in a second orientation engaging the second opening as viewed from the inner side of the side airbag device.

As shown in FIG. 13B, FIG. 14A, and FIG. 14B, the second protrusion 83 and the third protrusions 84 have claws 83A and 84A that are caught on the edge portion of the second opening 28 when the cap 80 engages the second opening 28. The claw 83A protrudes in a direction away from the first protrusion 82 in the up-down direction. The claw 84A provided on one third protrusion 84 protrudes away from the other third protrusion 84, and the claw 84A provided on the other third protrusion 84 protrudes away from the one third protrusion 84 in the front-rear direction.

The cap 80 is engagable with the second opening 28 in a first orientation shown in FIG. 14A and a second orientation shown in FIG. 14B. The second orientation is an orientation rotated 180 degrees from the first orientation. Specifically, the second orientation is an orientation rotated 180 degrees from the first orientation about an axis parallel to a direction in which the second opening 28 penetrates the base member 20. In the present embodiment, the lateral orientation of the first orientation and the second orientation are the same, and the up-down orientation or the front-rear orientation of the second orientation is rotated 180 degrees with respect to the first orientation.

As shown in FIG. 14A, when the cap 80 engages the second opening 28 in the first orientation, the first protrusion 82 is located in the first narrow portion 28B and the contacting portions 82A contact the upper edge of the second opening 28, and the second protrusion 83 is located in the second narrow portion 28C and the claw 83A catches the lower edge of the second opening 28. When the cap 80 engages the second opening 28 in the first orientation, the third protrusions 84 are located in the upper end portion of the broad portion 28A, and the claws 84A catch the first left and right edges of the second opening 28.

As shown in FIG. 14B, when the cap 80 engages the second opening 28 in the second orientation, the first protrusion 82 is located in the second narrow portion 28C and the contacting portions 82A contact the lower edge of the second opening 28, and the second protrusion 83 is located in the first narrow portion 28B and the claw 83A catches the upper edge of the second opening 28. When the cap 80 engages the second opening 28 in the second orientation, the third protrusions 84 are located in the lower end portion of the broad portion 28A, and the claws 84A catch the left and right edges of the second opening 28.

According to the side airbag device 1 and the automobile C of the present embodiment, contact of the retainer attaching portion 52 and the seat S can be restrained by the cover 23 extending in the extending direction at least to a position that the first fastening portion 57 is located, to cover the retainer attaching portion 52. Therefore, damage to the outer covering, the pad, etc. of the seat S can be restrained.

Since there is no need, for example, to add another member for covering the retainer attaching portion 52 to restrain direct contact of the retainer attaching portion 52 and the seat S, the increase in the number of parts for the side airbag device 1 can be restrained, and in turn increase in the number of process required for the assembly of the side airbag device 1 can be restrained.

Since the cover 23 extends further, than the first fastening portion 57, in the extending direction, contact of the retainer attaching portion 52 and the seat S can be further restrained.

Since the cover 23 covers at least a part of the left and right side surface 52S of the retainer attaching portion 52, contact of the side surface 52S of the retainer attaching portion 52 and the seat S can be restrained.

Since the cover 23 has a first opening 231A that exposes the whole first fastening portion 57, the fastening of the retainer attaching portion 52 to the body B and/or the frame of the seat S is not hindered.

Since the cover 23 has the holes 233 as the first engaging portion, and the retainer attaching portion 52 has the protrusions 52C as the second engaging portion, the cover 23 and the retainer attaching portion 52 can be retained by the engagement of the holes 233 and the protrusions 52C. Therefore, assembly of the side airbag device 1 can be simplified.

Since there is no need for another member for the fastening of the cover 23 and the retainer attaching portion 52, such as a bolt and a nut, the increase in the number of parts for the side airbag device 1 can be restrained, and in turn the increase of processes required for assembly of the side airbag device 1 can be restrained.

Since the direction in which the protrusions 52C protrude and the direction in which the first fastening portion 57 (through hole) penetrate the retainer member 50 is non-parallel to each other, engagement of the holes 233 and the protrusions 52C is less likely to be released when the retainer attaching portion 52 (side airbag device 1) is fastened to the body B and/or the frame of the seat S. Therefore, the retainer attaching portion 52A can be restrained from being detached from the cover 23 when fastening the side airbag device 1 to the body B and/or the frame of the seat S.

Since the retainer attaching portion 52 includes the attaching portion body 52A and left and right flanges 52B, the strength of the retainer attaching portion 52 is increased. Since the protrusion 52C protrude from one of the flanges 52B, the strength of the protrusion 52C can be increased. Therefore, the retainer attaching portion 52 can be stably retained on to the cover 23.

Since the cover 23 includes the plurality of ribs 234, the strength of the cover 23 can be increased. Since at least one of the plurality of ribs 234 contacts the retainer attaching portion 52, rattling noise can be restrained.

Since the cover 23 includes the bottom wall portion 231 and the left and right side portions 232, and the plurality of ribs 234 extend from one side portion 232, along the bottom wall portion 231, to the other side portion 232, the strength of the cover 23 can be increased.

Since the second fastening portion 58A that is to be fastened to the body B is provided on the retainer body 51, and the base member 20 has the second opening 28 that exposes the second fastening portion 58A such that the fastening portion 58A can be fastened to the body B, the fastening of the body B and the second fastening portion 58A can be made easier.

Since the side airbag device 1 comprises the cap 80 that engages and covers the second opening 28, the second opening 28 can be closed.

Since the cap 80 is engagable with the second opening 28 in the first orientation and the second orientation rotated 180 degrees from the first orientation, the cap 80 can be engaged with the second opening 28 without caring about the orientation of the cap 80. Therefore, the assembly of the side airbag device 1 can be simplified.

Although an embodiment has been described above, the side airbag device and vehicle may be appropriately modified and implemented as shown in other examples described below.

Figure 15:
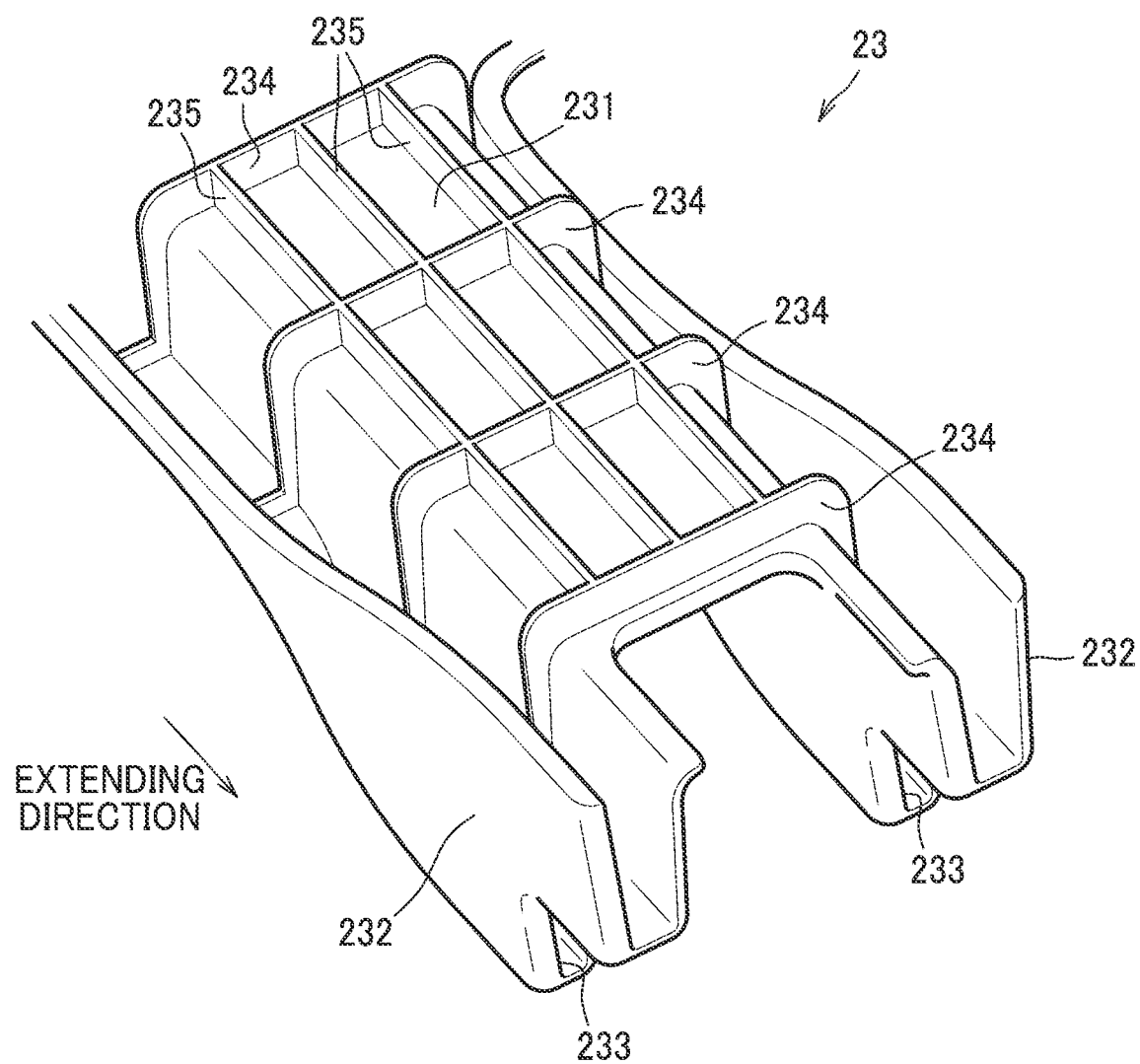
FIG. 15 is a perspective view of a cover of the side airbag device according to a modified example as viewed from the back side.

For example, as shown in FIG. 15, the cover 23 may further include a second rib 235. The second rib 235 is a rib that is provided such that the second rib 235 is non-parallel to the plurality of ribs 234. Specifically, the second rib 235 protrudes from the bottom wall portion 231 of the cover 23 and extends in the extending direction perpendicular to the plurality of ribs 234. For example, three second ribs 234 are provided apart from each other by given distance in the left-right direction. At least one of the second ribs 235, similar to the ribs 234, may contact the cover 23. The cover 23 may be further reinforced by having the second ribs 235.

In the above-described embodiment, the side airbag device 1 is configured such that the plurality of ribs 234 of the cover 23 contact the retainer attaching portion 52, but, for example, the side airbag device 1 may be configured such that only one of the plurality of ribs contact the retainer attaching portion. In other words, the side airbag device may be configured such that at least one of the plurality of ribs contact the retainer attaching portion. The side airbag device may also be configured such that none of the plurality of ribs contact the retainer attaching portion.

In the above-described embodiment, the plurality of ribs 234 are formed on the cover 23 to extend from one side portion 232, along the bottom wall portion 231, to the other side portion 232, but, for example, the at least one of the plurality of ribs may be formed only on the bottom wall portion or only on the side portion. The cover may also be configured to have no rib.

In the above-described embodiment, the direction in which the protrusion 52 protrudes and the direction that the first fastening portion 57 (through hole) penetrates the base member 20 are non-parallel to each other, but, for example, the direction in which the protrusion protrudes and the direction in which the fastening portion (through hole) extends may be parallel to each other. In this instance, it is desirable for the direction in which the protrusion is inserted in the hole to be parallel to the direction in which the fastening portion is passed through the through hole.

In the above-described embodiment, the configuration in which the first engaging portion of the cover 23 is a hole 233 and the second engaging portion of the retainer attaching portion 52 is a protrusion 52C that protrudes such that the protrusion 52C is engagable with the hole 233, is given as an example. However, the second engaging portion may be a hole and the first engaging portion may be a protrusion engagable with the hole (second engaging portion). Also, although the hole 233 is a through hole in the above-described embodiment, the hole may be a hole that has a bottom.

The side airbag device may also have a configuration that does not comprise the first engaging portion and the second engaging portion. In this instance, the cover and the retainer attaching portion may be configured to be fastened to each other by, for example, fastening of a bolt and a nut. The cover and the retainer attaching portion may also be configured not to be retained to each other.

In the above described embodiment, the side portions 232 of the cover 23 covers parts of the left and right side surfaces 52S of the retainer attaching portion 52, but, for example, the cover may cover the entire surfaces of the left and right side surfaces of the retainer attaching portion 52. In other words, the cover may be configured to cover at least parts of the left and right side surfaces of the retainer attaching portion. The cover may also be configured not to cover the left and right side surfaces of the retainer attaching portion.

In the above-described embodiment, the cover 23 is configured to extend further in the extending direction than the first fastening portion 57 (fastening portion), but, for example, the cover may be configured to extend in the extending direction to a position where an end of the cover overlaps the first fastening portion.

In the above-described embodiment, the retainer body 51 and the retainer attaching portion 52 of the retainer member 50 is integrally formed, but, for example, the retainer body and the retainer attaching portion may be formed as different members and may be joined together to form the retainer member. In this instance, the retainer body and the retainer attaching portion may, for example, be joined by welding, or can be joined by fastening of a bolt and a nut, or the like.

In the above described embodiment, the cap 80 is engagable with the second opening 28 in both the first orientation and the second orientation, but, for example, the cap may be engagable with the second opening only in a given orientation. Also, there may be a plurality of the second openings and the caps, and in this instance, the plurality of caps may be common parts that may be used in any of the second openings.

In the above-described embodiment, the second fastening portion 58A is provided on the retainer body 51, and the base member 20 has the second opening 28, but, for example, the retainer body may not have the second fastening portion. In this instance, the base member may be configured not to comprise the second opening. The side airbag device may be configured to not have the cap, naturally when the base member does not comprise the second opening, and also when the base member comprises the second opening.

In the above-described embodiment, the back seat of the automobile C is given as an example of the seat S, but the seat may, for example, be a front seat of an automobile such as a driver seat or a passenger seat, or a seat positioned between the front seats and the back seats.

In the above-described embodiment, an automobile C is given as an example of a car, but, for example, the car may be a railway car. In the above-described embodiment, a car is given as an example of a vehicle, but, for example, the vehicle may be an aircraft or a ship.

The elements explained in the above-described embodiments and modified examples may be implemented selectively and in combination as desired.

What is claimed is:

1. A side airbag device provided between a body and a seat of a vehicle, comprising:
   an airbag module comprising:
      an air bag, and
      an inflator configured to supply the air bag with gas;
   a base member disposed between the body and the seat, the base member including an airbag housing portion configured to contain the airbag module; and
   a retainer member configured to support the airbag housing portion;
   wherein the retainer member comprises:
      a retainer body configured to support the airbag housing portion; and
      a retainer attaching portion extending downward from the retainer body;
   wherein the retainer attaching portion includes comprises:
      a fastening portion configured to fasten the retainer member to the body or a frame of the seat,
   wherein the base member comprises:
      a base member body in which the airbag housing portion is provided; and
      a cover extending from the base member body and opposed to the retainer attaching portion, and
      wherein the cover extends from the base member body in an extending direction at least to a position in which the fastening portion is disposed, the cover covering the retainer attaching portion.

2. The side airbag device according to claim 1, wherein the cover extends further than the fastening portion in the extending direction.

3. The side airbag device according to claim 1, wherein the cover covers at least a part of left and right side surfaces of the retainer attaching portion.

4. The side airbag device according to claim 1, wherein the cover has an opening that exposes an entirety of the fastening portion.

5. The side airbag device according to claim 1,
   wherein the cover has a first engaging portion, and
   wherein the retainer attaching portion has a second engaging portion configured to be engaged with the first engaging portion.

6. The side airbag device according to claim 5,
   wherein one of the first engaging portion or the second engaging portion is a hole and the other of the first engaging portion or the second engaging portion is a protrusion engageable with the hole,
   wherein the fastening portion is a through hole, and
   wherein a direction in which the protrusion protrudes and a direction in which the through hole penetrates are non-parallel to each other.

7. The side airbag device according to claim 5,
   wherein the first engaging portion is a hole, and the second engaging portion is a protrusion engageable with the hole,
   wherein the retainer attaching portion comprises:
      an attaching portion body including the fastening portion; and
      left and right flanges extending upward from left and right ends of the attaching portion body, and
      wherein the protrusion protrudes from one of the flange.

8. The side airbag device according to claim 1,
   wherein the cover includes a plurality of ribs,
   wherein at least one of the plurality of ribs is in contact with the retainer attaching portion.

9. The side airbag device according to claim 8,
   wherein the cover comprises:
      a bottom wall portion; and
      left and right side portions standing up from left and right ends of the bottom wall portion,
   wherein the plurality of ribs extend along one of the left side portion or the right side portion, the bottom wall portion, and the other of the left side portion or the right side portion.

10. A vehicle comprising:
    a body;
    a seat; and
    the side airbag device according to claim 1.

11. The side airbag device according to claim 1,
    wherein the fastening portion has a through hole through which fasteners configured to fasten the retainer member to the body or the frame of the seat are inserted, and
    wherein the cover extends from the base member body in the extending direction at least to a position in which the through hole is disposed.

* * * * *